US006987504B2

(12) United States Patent
Rosenberg et al.

(10) Patent No.: US 6,987,504 B2
(45) Date of Patent: *Jan. 17, 2006

(54) INTERFACE DEVICE FOR SENSING POSITION AND ORIENTATION AND OUTPUTTING FORCE TO A USER

(75) Inventors: Louis B. Rosenberg, Pleasanton, CA (US); Bernard G. Jackson, Mountain View, CA (US)

(73) Assignee: Immersion Corporation, San Jose, CA (US)

( * ) Notice: Subject to any disclaimer, the term of this patent is extended or adjusted under 35 U.S.C. 154(b) by 473 days.

This patent is subject to a terminal disclaimer.

(21) Appl. No.: 10/043,374

(22) Filed: Jan. 8, 2002

(65) Prior Publication Data

Related U.S. Application Data

(63) Continuation of application No. 09/511,413, filed on Feb. 23, 2000, now Pat. No. 6,366,273, which is a continuation of application No. 09/248,175, filed on Feb. 9, 1999, now Pat. No. 6,046,727, which is a continuation of application No. 08/784,198, filed on Jan. 15, 1997, now Pat. No. 5,880,714, which is a continuation of application No. 08/583,032, filed as application No. PCT/US94/07851 on Jul. 12, 1994, now Pat. No. 5,701,140.

(51) Int. Cl.
*G09G 5/00* (2006.01)

(52) U.S. Cl. ..................................... 345/156; 345/179
(58) Field of Classification Search ................ 345/156, 345/157, 158, 161, 162, 163, 179, 180; 703/6, 703/7; 178/18.01–18.07, 19.01–19.05
See application file for complete search history.

(56) References Cited

U.S. PATENT DOCUMENTS

| 2,906,179 A | 9/1959 | Bower |
| 2,972,140 A | 2/1961 | Hirsch |
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,531,868 A | 10/1970 | Stevenson |

(Continued)

FOREIGN PATENT DOCUMENTS

EP 0 349 086 A1 1/1990

(Continued)

OTHER PUBLICATIONS

"3D Human Interface Tool," Immersion Probe™, Immersion Corporation.

(Continued)

*Primary Examiner*—Ricardo Osorio
(74) *Attorney, Agent, or Firm*—Thelen Reid & Priest LLP; David B. Ritchie

(57) ABSTRACT

An interface device for use with a computer that provides locative data to a computer for tracking a user manipulatable physical object and provides feedback to the user through output forces. The physical object is movable in multiple degrees of freedom and is tracked by sensors for sensing the location and orientation of the object. A device processor can be responsive to the output of the sensors and can provide the host computer with information derived from the sensors. The host computer can provides images on a display, where the computer responds to the provided sensor information and force feedback is correlated with the displayed images via force feedback commands from the host computer.

25 Claims, 9 Drawing Sheets

U.S. PATENT DOCUMENTS

| | | |
|---|---|---|
| 3,623,064 A | 11/1971 | Kagan |
| 3,890,958 A | 6/1975 | Fister et al. |
| 3,902,687 A | 9/1975 | Hightower |
| 3,903,614 A | 9/1975 | Diamond et al. |
| 3,911,416 A | 10/1975 | Feder |
| 3,919,691 A * | 11/1975 | Noll ........................... 345/419 |
| 3,923,166 A | 12/1975 | Fletcher et al. |
| 3,944,798 A | 3/1976 | Eaton |
| 4,127,752 A | 11/1978 | Lowthorp |
| 4,143,505 A | 3/1979 | Sheesley et al. |
| 4,160,508 A | 7/1979 | Frosch et al. |
| 4,216,467 A | 8/1980 | Colston |
| 4,236,325 A | 12/1980 | Hall et al. |
| 4,262,549 A | 4/1981 | Schwellenbach |
| 4,333,070 A | 6/1982 | Barnes |
| 4,398,889 A | 8/1983 | Lam et al. |
| 4,464,117 A | 8/1984 | Foerst |
| 4,477,973 A | 10/1984 | Davies |
| 4,484,191 A | 11/1984 | Vavra |
| 4,513,235 A | 4/1985 | Acklam et al. |
| 4,538,035 A | 8/1985 | Pool |
| 4,571,834 A | 2/1986 | Fraser et al. |
| 4,581,491 A | 4/1986 | Boothroyd |
| 4,593,470 A | 6/1986 | Davies |
| 4,599,070 A | 7/1986 | Hladky et al. |
| 4,632,341 A | 12/1986 | Repperger et al. |
| 4,638,798 A | 1/1987 | Shelden et al. |
| 4,653,011 A | 3/1987 | Iwano |
| 4,654,648 A | 3/1987 | Herrington et al. |
| 4,670,851 A | 6/1987 | Murakami et al. |
| 4,676,002 A | 6/1987 | Slocum |
| 4,679,331 A | 7/1987 | Koontz |
| 4,688,983 A | 8/1987 | Lindbom |
| 4,703,443 A | 10/1987 | Moriyasu |
| 4,708,656 A | 11/1987 | de Vries et al. |
| 4,713,007 A | 12/1987 | Alban |
| 4,750,487 A | 6/1988 | Zanetti |
| 4,769,763 A | 9/1988 | Trieb et al. |
| 4,775,289 A | 10/1988 | Kazerooni |
| 4,787,051 A | 11/1988 | Olson |
| 4,791,934 A | 12/1988 | Brunnett |
| 4,794,392 A | 12/1988 | Selinko |
| 4,800,721 A | 1/1989 | Cemenska et al. |
| 4,803,413 A | 2/1989 | Kendig et al. |
| 4,811,608 A | 3/1989 | Hilton |
| 4,819,195 A | 4/1989 | Bell et al. |
| 4,839,838 A | 6/1989 | LaBiche et al. |
| 4,849,692 A | 7/1989 | Blood |
| 4,879,556 A | 11/1989 | Duimel |
| 4,885,565 A | 12/1989 | Embach |
| 4,888,877 A | 12/1989 | Enderle et al. |
| 4,891,764 A | 1/1990 | McIntosh |
| 4,891,889 A | 1/1990 | Tomelleri |
| 4,907,970 A | 3/1990 | Meenen, Jr. |
| 4,907,973 A | 3/1990 | Hon |
| 4,930,770 A | 6/1990 | Baker |
| 4,934,694 A | 6/1990 | McIntosh |
| 4,942,545 A | 7/1990 | Sapia |
| 4,945,305 A | 7/1990 | Blood |
| 4,945,501 A | 7/1990 | Bell et al. |
| 4,949,119 A | 8/1990 | Moncrief et al. |
| 4,961,138 A | 10/1990 | Gorniak |
| 4,961,267 A | 10/1990 | Herzog |
| 4,962,591 A | 10/1990 | Zeller et al. |
| 4,982,504 A | 1/1991 | Soderberg et al. |
| 4,983,901 A | 1/1991 | Lehmer |
| 5,007,085 A | 4/1991 | Greanias et al. |
| 5,007,300 A | 4/1991 | Siva |
| 5,019,761 A | 5/1991 | Kraft |
| 5,022,384 A | 6/1991 | Freels et al. |
| 5,022,407 A | 6/1991 | Horch et al. |
| 5,035,242 A | 7/1991 | Franklin et al. |
| 5,038,089 A | 8/1991 | Szakaly |
| 5,040,306 A | 8/1991 | McMurtry et al. |
| 5,044,956 A | 9/1991 | Behensky et al. |
| 5,050,608 A | 9/1991 | Watanabe et al. |
| 5,072,361 A | 12/1991 | Davis et al. |
| 5,076,517 A | 12/1991 | Ferranti et al. |
| 5,078,152 A | 1/1992 | Bond et al. |
| 5,088,046 A | 2/1992 | McMurtry |
| 5,088,055 A | 2/1992 | Oyama |
| 5,095,303 A | 3/1992 | Clark et al. |
| 5,103,404 A | 4/1992 | McIntosh |
| 5,107,080 A | 4/1992 | Rosen |
| 5,113,179 A | 5/1992 | Scott-Jackson et al. |
| 5,116,051 A | 5/1992 | Moncrief et al. |
| 5,128,671 A | 7/1992 | Thomas, Jr. |
| 5,131,844 A | 7/1992 | Marinaccio et al. |
| 5,132,672 A | 7/1992 | Clark |
| 5,139,261 A | 8/1992 | Openiano |
| 5,142,506 A | 8/1992 | Edwards |
| 5,142,931 A | 9/1992 | Menahem |
| 5,143,505 A | 9/1992 | Burdea et al. |
| 5,146,566 A * | 9/1992 | Hollis et al. .................. 710/73 |
| 5,148,377 A | 9/1992 | McDonald |
| 5,165,897 A | 11/1992 | Johnson |
| 5,175,459 A | 12/1992 | Danial et al. |
| 5,181,181 A | 1/1993 | Glynn |
| 5,182,557 A | 1/1993 | Lang |
| 5,184,306 A | 2/1993 | Erdman et al. |
| 5,184,319 A | 2/1993 | Kramer |
| 5,185,561 A | 2/1993 | Good et al. |
| 5,186,695 A | 2/1993 | Mangseth et al. |
| 5,187,874 A | 2/1993 | Takahashi et al. |
| 5,189,806 A | 3/1993 | McMurtry et al. |
| 5,193,963 A | 3/1993 | McAffee et al. |
| 5,197,003 A | 3/1993 | Moncrief et al. |
| 5,203,563 A | 4/1993 | Loper, III |
| 5,204,824 A | 4/1993 | Fujimaki |
| 5,209,131 A | 5/1993 | Baxter |
| 5,209,661 A | 5/1993 | Hildreth et al. |
| 5,212,473 A | 5/1993 | Louis |
| 5,216,948 A | 6/1993 | Sheppard et al. |
| 5,220,260 A * | 6/1993 | Schuler ..................... 318/561 |
| 5,223,776 A | 6/1993 | Radke et al. |
| 5,228,356 A | 7/1993 | Chuang |
| 5,230,623 A | 7/1993 | Guthrie et al. |
| 5,240,417 A | 8/1993 | Smithson et al. |
| 5,243,266 A | 9/1993 | Kasagami et al. |
| 5,251,127 A | 10/1993 | Raab |
| 5,251,156 A | 10/1993 | Heier et al. |
| 5,259,120 A | 11/1993 | Chapman et al. |
| 5,259,894 A | 11/1993 | Sampson |
| 5,264,768 A | 11/1993 | Gregory et al. |
| 5,271,290 A | 12/1993 | Fischer |
| 5,275,174 A | 1/1994 | Cook |
| 5,275,565 A | 1/1994 | Moncrief |
| 5,283,970 A | 2/1994 | Aigner |
| 5,286,203 A | 2/1994 | Fuller et al. |
| 5,289,273 A | 2/1994 | Lang |
| 5,296,846 A | 3/1994 | Ledley |
| 5,299,810 A | 4/1994 | Pierce et al. |
| 5,309,140 A | 5/1994 | Everett, Jr. et al. |
| 5,334,027 A | 8/1994 | Wherlock |
| 5,351,692 A | 10/1994 | Dow et al. |
| 5,354,162 A | 10/1994 | Burdea et al. |
| 5,368,484 A | 11/1994 | Copperman et al. |
| 5,379,663 A | 1/1995 | Hara |
| 5,384,460 A | 1/1995 | Tseng |
| 5,389,865 A * | 2/1995 | Jacobus et al. ......... 318/568.11 |
| 5,396,266 A | 3/1995 | Brimhall |
| 5,397,323 A | 3/1995 | Taylor et al. |
| 5,402,582 A | 4/1995 | Raab |
| 5,405,152 A | 4/1995 | Katanics et al. |

| | | |
|---|---|---|
| 5,412,880 A | 5/1995 | Raab |
| 5,414,337 A | 5/1995 | Schuler |
| 5,417,696 A | 5/1995 | Kashuba et al. |
| 5,428,748 A | 6/1995 | Davidson et al. |
| 5,429,140 A | 7/1995 | Burdea et al. |
| 5,435,729 A | 7/1995 | Hildreth et al. |
| 5,436,542 A | 7/1995 | Petelin et al. |
| 5,436,622 A | 7/1995 | Gutman et al. |
| 5,437,607 A | 8/1995 | Taylor |
| 5,445,166 A | 8/1995 | Taylor |
| 5,459,382 A | 10/1995 | Jacobus et al. |
| 5,466,213 A | 11/1995 | Hogan et al. |
| 5,467,763 A | 11/1995 | McMahon et al. |
| 5,512,919 A | 4/1996 | Araki |
| 5,513,100 A | 4/1996 | Parker et al. |
| 5,547,382 A | 8/1996 | Yamasaki et al. |
| 5,559,432 A | 9/1996 | Logue |
| 5,575,761 A | 11/1996 | Hajianpour |
| 5,576,727 A * | 11/1996 | Rosenberg et al. ......... 345/179 |
| 5,587,937 A | 12/1996 | Massie et al. |
| 5,589,828 A | 12/1996 | Armstrong |
| 5,591,924 A | 1/1997 | Hilton |
| 5,629,594 A | 5/1997 | Jacobus et al. |
| 5,631,861 A | 5/1997 | Kramer |
| 5,634,794 A | 6/1997 | Hildreth et al. |
| 5,690,582 A | 11/1997 | Ulrich et al. |
| 5,691,898 A | 11/1997 | Rosenberg et al. |
| 5,701,140 A | 12/1997 | Rosenberg et al. |
| 5,734,373 A | 3/1998 | Rosenberg et al. |
| 5,739,811 A | 4/1998 | Rosenberg et al. |
| 5,766,016 A | 6/1998 | Sinclair et al. |
| 5,781,172 A | 7/1998 | Engel et al. |
| 5,785,630 A | 7/1998 | Bobick et al. |
| 5,790,108 A | 8/1998 | Salcudean et al. |
| 5,880,714 A | 3/1999 | Rosenberg et al. |
| 5,899,672 A | 5/1999 | Salamey |
| 6,004,134 A | 12/1999 | Marcus et al. |
| 6,037,927 A | 3/2000 | Rosenberg |
| 6,046,727 A | 4/2000 | Rosenberg et al. |
| 6,050,718 A | 4/2000 | Schena et al. |
| 6,057,828 A | 5/2000 | Rosenberg et al. |
| 6,104,158 A | 8/2000 | Jacobus et al. |
| 6,111,577 A | 8/2000 | Zilles et al. |
| 6,186,048 B1 | 2/2001 | Kimura et al. |
| 6,422,941 B1 | 7/2002 | Thorner et al. |

FOREIGN PATENT DOCUMENTS

| | | |
|---|---|---|
| GB | 2254911 A | 10/1992 |
| JP | H2-185278 | 7/1990 |
| JP | H4-8381 | 1/1992 |
| JP | 434610 A | 2/1992 |
| JP | H5-192449 | 8/1993 |
| JP | H7-24147 | 1/1995 |
| WO | WO0950281 | 1/1995 |
| WO | WO9520787 | 8/1995 |
| WO | WO9520788 | 8/1995 |
| WO | WO9616397 | 5/1996 |
| WO | WO9622591 | 7/1996 |

OTHER PUBLICATIONS

"Cursor Waldo," Designer's Corner-Useful Technology for Your Idea File, Design News, Mar. 7, 1993, pp. 63.

"Digital Control Loading," Agenda Item 10, Paper 3, International Air Transport Association, Seventh Flight Simulator Technical Sub-Committee Meeting, Montreal, Sep. 17-20, 1984.

"Foot-Operated Mouse," IBM Technical Disclosure Bulletin, Apr. 1986, vol. 28, No. 11.

"High Performance Model of the Immersion Probe." Immersion Probe-MD™, Immersion Corporation.

"Proceedings of the IFIP Congress 65," International Federation for Information Processing Information Processing 1965, vol. 3, New York, May 24-29, 1965, pp. 506.

"The Personal Digitizer™," Immersion Corporation.

Adelstein Bernard D. et al., "A High Performance Two Degree-of-Freedom Kinesthetic Interface," MIT 1992, pp. 108-112.

Adlestein, Bernard D. et al., "Design and Implementation of a Force Reflection Manipulandum for Manual Control Resarch," 1992, pp. 1-24.

Akamatsu et al., "Multimodal Mouse: A Mouse-Type Device with Tactile and Force Display," 1994, Presence vol. 3, pp. 73-80.

Albers, F. Gerry, "Microcomputer Base for Control Loading," Naval Training Equipment Center 11$^{th}$ NTEC-Industry Conference Proceedings, NAVTRAEQUIPCEN IH-306, Nov. 14-16, 1978.

Atkinston, William D. et al., "Computing with Feeling," Comput. & Graphics, vol. 2, No. 2-E, pp. 97-103.

Baigrie, Stephen A., Reflectone Inc., "Electric Control Loading—A Low Cost, High Performance Alternative," American Defense Preparedness Association 12$^{th}$ Interservice/Industry Training System Conference, No. 6-8, 1990.

Baradat, Jean and Lacroix, Michel, "Advanced Features in Control Loading and Motion Systems for Simulators," National Security Industrial Association 1$^{st}$ Interservice/Industry Training Equipment Conference Proceedings, Nov. 27-29, 1981.

Batter, James J. et al., "Grope-1: A Computer Display to the Sense of Feel," pp. TA-4-188-TA-4-192.

Bejczy, Antal K., "The Phantom Robot: Predictive Displays for Teleoperation with Time Delay," IEEE 1990. pp. 546-550.

Brooks, Jr. et al., "Project GROPE, Haptic Displays for Scientific Visualization,", Computer Graphics, vol. 2 4, #4, 1990, pp. 177-184.

Burdea, Grigore et al., "A Portable Dextrous Master with Force Feedback," Presence: Teleoperators and Virtual Environments, MIT Press, Jun. 1991.

Burdea, Grigore et al., "Dextrous Telerobotics with Force Feedback—An Overview," Robotics 1991, vol. 9.

Burdea, Grigore et al., "Distributed Virtual Force Feedback," IEEE, May 2, 1993, pp. 25-44.

Buttolo, Pietro et la., "Pen-Based Force Display for Precision Manipulation in Virtual Environments," IEEE Mar. 1995, pp. 1-8.

Calvin McCoy Winey III, "Computer Simulated Visual and Tactile Feedback as an Aid to Manipulator and Vehicle Control", S.B. Massachusetts Institute of Technology, Jun. 1981.

Colgete, J. Edward et al., "Implementation of Stiff Wirtual Walls in Force-Reflecting Interfaces," Sep. 22, 1993, pp. 1-9.

Cooper, Agenda Item 10, Paper 2, "Digital Flight Controls," "Digital Control Loading," International Air Transport Association, Seventh Flight Simulator Technical Sub-Committe Meeting, Montreal, Sep. 17-20, 1984.

Corrao, J.M., "Control Loading," American Institute of Aeronautics and Astronautic's Flight Simulation Update 1988, Jan. 11-15, 1988.

Corrao, Joseph M., "Control Loading," American Institute of Aeronautics and Astronautic's Flight Simulation Update 1987 Jan. 12-16, 1987.

De Vries, L. et al., Agenda Item 10, Paper 1, "*Performance Considerations, Design Criteria and Realization of a Digital Control Loading System,*" "*Digital Control Loading,*" International Air Transport Association, Seventh Flight Simulator Technical Sub-Committe Meeting, Agenda Item 10, Montreal, Sep. 17-20, 1984.

Ellis, R.E. et al., "*Design and Evalusation of a High-Performance Prototype Planar Haptic Interface,*" ASME Dec. 3, 1993, DSC-vol. 49, pp. 55-64.

Fischer, Patrick et al., "*Specification and Design of Input Devices for Teleoperation,*" 1990.

Fisher, S.S., et al., "*Virtual Enviornment Display System,*" ACM 1986 Workshop on Interactive 3D Graphics Oct. 23-24.

Giel et al. "*Digital Control Loading,*" Summary, International Air Transport Association, Seventh Flight Simulator Technical Sub-Committee Meeting, Item No. 10, Montreal, Sep. 17-20, 1984.

Gotow, J.K. et al., "*Perception of Mechanical Properties at the Man-Machine Interface,*" IEEE 1987, pp. 688-689.

Hannaford, Blake et al., "*Performance Evaluation of a Six-Axis Generalized Force-Reflecting Teleoperator,*" IEEE May/Jun. 1991, vol. 21, No. 3, pp. 620-633.

Herndon, J.N. et al., "*The Sate-of-the-Art Model M-2 Maintenance System,*" Proc. Of the 1984 National Topical Meeting on Robotics and Remote Handling in Hostile Environments, American Nuclear Society, pp. 59-65.

Hildreth, Bruce L., Eyermann, Roger E. and Trankle, Tomas Dr., "*DC Servo-Motors for High Performance High Reliability Control Loading in Flight Simulators,*" American Defense Preparedness Association 12th Interservice/Industry Training System Conference, Nov. 6-8, 1990.

Hirota et all., "*Development of Surface Display,*" IEEE 0-7803-1363-1, 1993, pp. 256-262

Howe, Robert D., "*Task Performance with a Dextrous Teleoperated Hand System,*" Proceedings of SPIE, Nov. 1992, vol. 1833, p. 1-9.

Iwata et al., "*Artificial Reality w/Force-Feedback: Devlopment of Desktop Virtual Space with Compact Master Manipulator,*" Computer Graphics, vol. 24, No. 4, 1990, pp. 165-170.

Iwata, Hiroo et al., "*Volume Haptization,*" IEEE 1993, pp. 16-18.

Iwata, Hiroo, "*Pen-based Haptic Virtual Environment,*" Institute of Engineering Mechanics, University of Tsukuba, Japan, pp. 387-292.

Jacobsen, S.C. et al., "*High Performance, High Dexterity, Force Reflective Teleoperator II,*" ANS Topical Meeting on Robotics & Remote Systems, 1991, pp. 1-10.

Kelley, et al., "*MagicMouse: Tactile and Kinesthetic Feedback in the Human-Computer Interface Using an Electromagnetically Actuated Input/Output Device,*" Dept. of Elec. Eng., Univ. of British Columbia, Oct. 1993.

Kenneth Meyer et al., "*Survey of Position Trackers,*" The Massachusetts Institute of Technology Spring 1992, vol. 1, No. 2, pp. 173-200.

Kim, Won S. et al., "*A Teleoperation Training Simulator with Visual Kinesthetic Force Virtual Reality,*" Human Vision, Visual Proceedings, Proc. SPIE 1666, San Jose, CA, Feb. 1992.

Kim, Won S. et al., "*Graphics Displays for Operator Aid in Telemanipulation,*" IEEE 1991, pp. 1059-1067.

Kotoku, Tetsuo, "*A Predictive Display with Force Feedback and its Application to Remote Manipulation System with Transmission Time Display,*" IEEE 1992, Jul. 7-10, 1992, pp. 239-246.

Kotoku, Tetsuo et al., "*Environment Modeling for the Interactive Display (EMID) Used in Telerobotic Systems,*" IEEE Nov. 3-5, 1991, pp. 99-1004.

Massimo Andrea Russe, "*The Design and Implementation of a Three Degree-of-Freedom Force Output Joystick,*", Department of Mechanical Engineering, May 11, 1990.

McAffee, Douglas A., "*Teleoperator System/Telerobot Demonstrator: Force Reflecting Hand Controller Equipment Manual,*" JPL Jan. 1988, pp. 3-8, 11, and A-34.

Meyer, Kenneth et al., "*Survey of Position Trackers,*" The Massachusetts Institute of Technology, Spring 1992, vol. , No. 2, pp. 173-200.

Millman et al., "*Design of a 4 Degree of Freedom Force-Reflecting Manipulandum with a Specified Force/Torque Workspace,*" IEEE CH2969-4, 1991, pp. 1488-1493.

Minsky, Margaret et al., "*Feeling and Seeing: Issues in Force Display,*" ACM 1990, pp. 235-242.

Noll, A. Michael, "*Man-Machine Tactile Communication Dissertation,*" Polytechnic Institute of Brooklyn, Jun. 1971, pp. 1-88.

Norlin, Ken A., "*Flight Simulation Software at NASA Dryden Flight Research Center,*" American Institute of Aeronautics and Astronautic's Flight Simulation Technologies Conference, Baltimore, MD, August 7-10, 1995.

Ouh-young, Ming et al., "*Force Display Performs Better than Visual Display in a Simple 6-D Docking Task,*" IEEE 1989, pp. 1462-1466.

Ouh-young, Ming et al., "*Using a Manipulator for Force Display in Molecular Docking,*" IEEE 1988, pp. 1824-1829.

Ouh-young, Ming, "*Force Display in Molecular Docking,*" Chapel Hill 1990, pp. 1-85.

Paul Jerome Kilpatrick, "*The Use of a Kinesthetic Supplement in an Interactive Graphics System*", Xerox University Microfilms, Ann Arbor, Michigan 48106, ©Copyright by Paul Jerome Kilpatrick 1976.

Rinaldi, P., "*Digital Control Loading—A Modular Approach,*" International Air Transport Association 6th Meeting of the Flight Simulator Technical Sub-Committee, Montreal, Jun. 1-4, 1982.

Rolfe, J.M. and Staples, K.J., "*Flight Simulation,*" eds. 1986.

Rosenberg, Louis B. et al., "*Perceptual Decomposition of Virtual Haptic Surfaces,*" IEEE, Oct. 1993.

Rosenberg, Louis B., "*Perceptual Design of a Virtual Rigid Surface Contact,*" Center for Design Research, Stanford University, Armstrong Laboratory, AL/CF-TR-1995-0029, Apr. 1993.

Rosenberg, Louis B., "*The Use of Virtual Fixtures as Perceptual Overlays to Enhance Operator Performance in Remote Environment,*" Air Force Material Command, Sep. 1992, pp. 1-42.

Rosenberg, Louis B., "*The Use of Virtual Fixtures to Enhance Operator Performance in Time Delayed Teleoperation*", Crew System Directorate Biodynamics and Biocommunications Division Wright-Patterson, Air Force Material Command, Mar. 1993, pp. 1-45.

Rosenberg, Louis B., "*Virtual Fixtures as Tools to Enhance Operator Performance in Telepresence Environments,*" SPIE Telemanipulator Technology, 1993.

Rosenberg, Louis B., "*Virtual Haptic Overlays Enhance Performance in Telepresence Tasks,*" SPIE 1994.

Rutherford, M., "*Third Generation Digital Flight Controls,*" CAE Electronics, Ltd., The Royal Aeronautical Society, 1984 Spring Convention Future Applications and Prospects for Flight Simulation, May 9-10, 1984, paper No. 15.

Seidensticker, Steve, "*Application of Microcomputers to the Simulator 'Linkage' Problem,*" National Security Industrial Association 4th Interservice/Industry Training Equipment Conference Proceedings, Nov. 16-18, 1982.

Smith, Geoffrey, "*Call It Palpable Progress,*" Business Week, October 9, 1995, pp. 93, 96.

Snow, E. et al., :*Compact Force-Reflecting Hand Controller*, JPL, Apr. 1991, vol. 15, No. 3, Item No. 153, pp. 1-15a.

Tan, Hong Z. et al., "*Human Factors for the Design of Force-Reflecting Haptic Interface,*" Tan, Srinivasan, Eberman, & Chang, ASME WAM 1994, pp. 1-11.

Tavkhelidze, D.S., "*Kinematic Analysis of Five-Ink Spherical Mechanisms,*" Mechanism and Machine Theory, 1974, vol. 9, pp. 181-190.

Wiker, Steven F. et al., "*Development of Tactile Mice for Blind Access to Computers: Importance of Stimulation Locus, Object Size, and Vibrotactile Display Resolution,*" Proceedings of the Human Factors Society 35th Annual Meeting 1991, pp. 708-712.

Yamakita, M. et al., "*Tele-Virtual Reality of Dynamic Mechanical Model,*" IEEE 992, pp. 1103-1110.

Baigrie, "Electric Control Loading—A Low Cost, High Performance Alternative," *Proceedings of Interservice/Industry Training Systems Congerence*, pp. 247-254, Nov. 6-8, 1990.

Iwata, "Pen-based Haptic Virtual Environment," 0-7803-1363-1/93 IEEE, pp. 287-292, 1993.

Russo, "The Design and Implementation of a Three Degree of Freedom Force Output Joystick," *MIT Libraries Archives* pp. 1-131, May 1990, archived Aug. 14, 1990.

Brooks et al., "Hand Controllers for Teleoperation—A State-of-the-Art Technology Survey and Evaluation," *JPL Publication* 85-11, NASA-CR-175890; N85-28559, pp. 1-84, Mar. 1, 1985.

Jones et al., "A perceptual analysis of stiffness," ISSN 0014-4819 Springer International (Springer-Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," 1993 *IEEE International Conference on Robotics and Automation*, pp. 25-44, May 02, 1993.

Snow et al., Model-X Force-Reflecting-Hand-Controller, NT Control No. NPO-17851: JPL Case No. 7348, pp. 1-4 with 45 pages of attechments, Jun. 15, 1989.

Ouh-Young, "Force Display in Molecular Docking," Doctoral Dissertation, University of North Carolina at Chapel Hill, UMI Order No. 9034744, p. 1-369, 1990.

Tadros, "Control System Design for a Three Degree of Freedom Virtual Environment Simulator Using Motor/Brake Pair Actuators," *MIT Archive*, pp. 1-88, Feb. 1990, archived Sep. 13, 1990.

Caldwell et al., "Enhanced Tactile Feedback (Tele-Taction) Using a Multi-Functional Sensory System," 1050-4729/93, pp. 955-960, 1993.

Adelstein et al., "Design and Implementation of a Force Reflection Manipulandum for Manual Control research," DSC- vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interaction Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol. 42, *Advances in Robotics*, pp. 63-70, ASME 1992.

Kontarinis et al., "Display of HIgh-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interation with Remote Environments," *Cooperative Intelligent Robotics in Space*, Rui J. deFigueiredo et al, Editor, Proc. SPIE vol. 1387, pp. 215-222, 1990.

Adelstein, "A Virtual Environment System For The Study of Human Arm Tremor," *Ph.D. Dissertation, Dept. of Mechanical Engineering*, MIT, Jun. 1989, archived Mar. 13, 1990.

Bejezy, "Sensors, Controls, and Man-Machine Interface for Advanced Teleoperation," *Science*, vol. 208, No. 4450, pp. 1327-1335, 1980.

Bejezy et al., "Generalization of Bilateral Force-Reflecting Control of Manipulators," *Proceedings of Fourth CISM-IFToMM*, Sep. 8-12, 1981.

McAffee et al., "Teleoperator Subsystem/Telerobot Demonstrator: Force Reflecting Hand Controller Equipment Manual," *JPL* 1988, JPL D-5172.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Forth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and dead-blind individuals," *IEEE Virtual Reality Annual International Symposium*, Seattle, WA, Sep. 18-22, 1993.

Rabinowitz et al., "Multidimensional tactile displays: Identification of vibratory intensity, Frequency, and contractor area," *Journal of The Acoustical Society of America*, vol. 82, No. 4, Oct. 1987.

Bejezy et al., "Kinesthetic Coupling Between Operator and Remote Manipulator," *International Computer Technology, The American Society of Mechanical Engineers*, San Fancisco, CA, Aug. 12-15, 1980.

Bejezy et al., "A Lavoratory Breadboard System For Dual-Arm Teleoperation," *SOAR '89 Workshop, JSC*, Houston, TX, Jul. 25-27, 1989.

Ouhyoung et al., "A Low-Cost Force Feeback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejezy, et al., "Universal Computer Control System (UCCS) For Space Telerobots," CH2413-3/87/0000/0318501.00 1987 IEEE, 1987.

Patrick, "Design, Construction, and Testing of a Fingertip Tactile Display for Interaction with Virtual and Remote Environments," *Master of Science Thesis*, MIT, Aug. 1990, archived Nov. 8, 1990.

Calder, "Design of A Force-Feedback Touch-Introducing Actuator For Teleoperator Robot Control," *Bachelor of Science Thesis*,MIT, May 1983, archived Jun. 23, 1983.

Wiker, "Teletouch Display Development: Phase 1 Report," *Technical Report 1230*, Naval Ocean Systems Center, San Diego, July 1988.

Bliss, "Optical-to-Tactile Image Conversion for the Blind," *IEEE Transactions on Man-Machine Systems*, vol. MMS-11, No. 1, Mar. 1970.

Johnson, "Shape-Memory Alloy Tactile Feedback Actuator," *Armstrong Aerospace Medical Research Laboratory*, AAMRL-TR-90-039, Aug. 1990.

Kontarinis et al., "Tactile Display of Vibratory Information in Teleoperation and Virtual Environments," PRESENCE, 4(4):387-402, Harvard Univ., 1995.

Aukstakalnis et al., "Silicon Mirage: The Art and Science of Virtual Reality," ISBN 0-938151-82-7, pp. 129-180, 1992.

Eberhardt et al., "Inducing Dynamic Haptic Perception by The Hand: System Description and Some Results," DSC-vol. 55-1, *Dynamic Systems and Control*: vol. 1, ASME 1994.

Gobel et al., "Tactile Feedback Applied to Computer Mice," *International Journal of Human-Computer Interaction*, vol.. 7, No. 1, pp. 1-24, 1995.

Pimentel et al., "Virtual Reality: through the new looking glass," $2^{th}$ Edition; McGraw-Hill, ISBN 0-07-050167-X, pp. 41-202, 1994.

"Cyberman Technical Specification," *Logitech Cyberman SWIFT Supplement to Logitech Mouse Technical Reference and Programming Guide*, Apr. 5, 1994.

Ouhyoung et al., "The Development of A Low-Cost Force Feedback Joystick and Its Use in the Virtual Reality Environment," *Proceedings of the Third Pacific Conference on Computer Graphics and Applications, Pacific Graphics '95*, Seoul, Korea, Aug. 21-24, 1995.

Kaczmarek et al., "Tactile Displays," *Virtual Environment Technologies*, Chap. 9, pp. 349-414.

Lake, "Cyberman from Logitech," at http://www.ibiblio.org/GameBytes/issue21/greviews/cyberman.html, 1994.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instructions With Parts Breakdown, Coaxial Control Shaker Part No. C-25502," Safe Flight Instrument Corporation, Revised Jul. 15, 1980 (23 pages).

Scannell, "Taking a Joystick Ride," *Computer Currents*, Boston Edition, vol. 9, No. 11, Nov. 1994.

Rosenberg, "Virtual Fixtures: Perceptual Overlays Enhance Operator Performance in Telepresence Tasks," *Ph.D. Dissertation*, Stanford University, Jun. 1994.

* cited by examiner

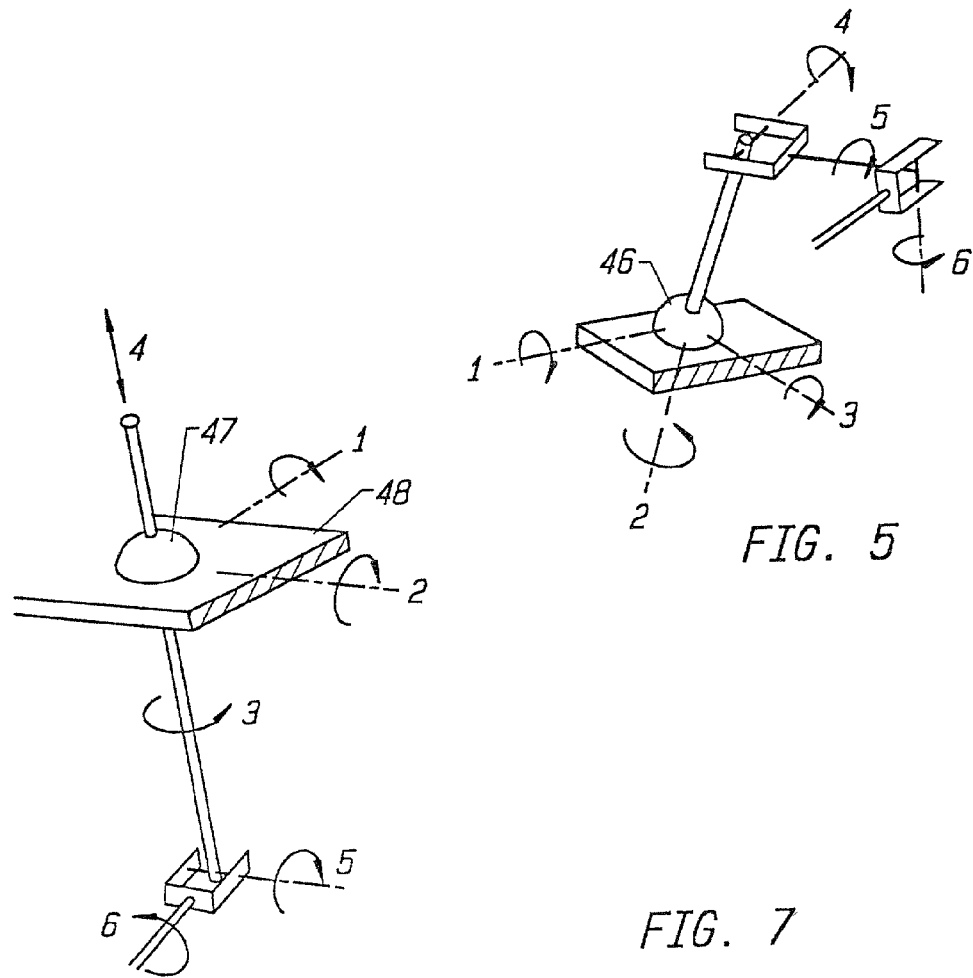
FIG. 5
FIG. 6
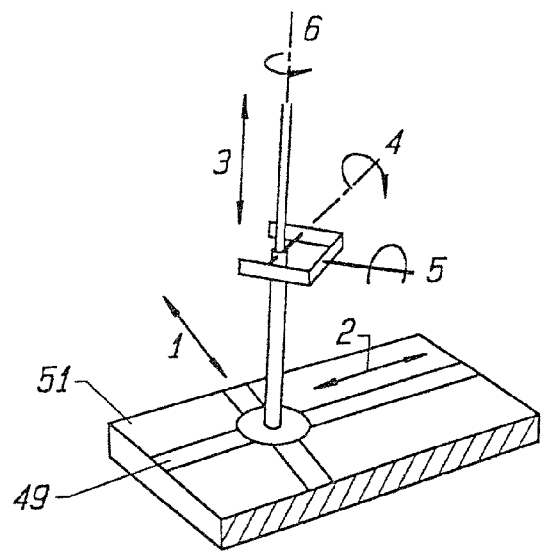
FIG. 7

INTERFACE DEVICE FOR SENSING POSITION AND ORIENTATION AND OUTPUTTING FORCE TO A USER

This application is a continuation of U.S. application Ser. No. 09/511,413, filed Feb. 23, 2000, now U.S. Pat. No. 6,366,273 which is a continuation of U.S. application Ser. No. 09/248,175, now U.S. Pat. No. 6,046,727, filed on Feb. 9, 1999, which is a continuation of U.S. application Ser. No. 08/784,198, now U.S. Pat. No. 5,880,714, filed on Jan. 15, 1997, which is a continuation of application Ser. No. 08/583,032, filed Feb. 16, 1996, and which issued as U.S. Pat. No. 5,701,140, which was the National Stage of International Application No. PCT/U594/07851, filed Jul. 12, 1994, which is a continuation of Application Ser. No. 08/092,974, filed Jul. 16, 1993, abandoned.

FIELD OF THE INVENTION

The present invention relates to a computer-human interface device, and more particularly it relates to a stylus coupled to a supportable mechanical linkage for providing and receiving commands to and from a computer.

BACKGROUND OF THE INVENTION

As the use of Computer Aided Design (CAD) Systems becomes more widespread, the need for cursor and command control devices which accurately and easily track three-dimensional position or motion is also growing. Devices which allow users to control a cursor with three-dimensional position and/or orientation commands are available for various applications. Among them are many hand-held input devices which allow users to interact with a host processor by controlling the position of a cursor or manipulating graphic objects on a computer screen. While these devices allow three-dimensional information to be transmitted to a computer they do not allow the user to use gestures and motions which are natural to the user.

For example, a prior art device of the type which is used for three-dimensional control involves the use of accelerometers to transduce the position and orientation of a stylus in space as described in U.S. Pat. No. 4,839,838. This device makes no provisions so the stylus can be grasped in a manner which makes use of finger dexterity nor does it include mechanical support to reduce fatigue or enhance user control or dexterity.

Another prior art example is an ultrasonic position-locating device like the one shown in U.S. Pat. No. 5,142,506. This device transduces position and orientation by triangulating ultrasonic signals. As with the prior art previously described, this device uses a free-floating stylus which includes no provisions for mechanical support to reduce fatigue or enhance user control or dexterity. Furthermore, this device is used with a stylus that is grasped in the palm of the hand. The use of such a stylus precludes fine positioning with the fingers and greatly reduces the dexterity of the user to manipulate position and orientation. In addition, this device is used with digital buttons on the stylus to send to the computer command signals. A button of this type is commonly called a "clicker" on a "mouse." Because such buttons are mechanically coupled to the free-floating stylus, it is difficult to push the buttons while maintaining the position and orientation of the stylus. By pushing down on the button, the user will necessarily move the stylus from its desired position. Accordingly, these commands are difficult to control under many circumstances.

SUMMARY OF THE INVENTION

In the present invention, the user holds a stylus which is supported by a support apparatus on a fixed surface so that the user can easily manipulate the stylus in free space to interact with a computer. The three-dimensional motion of the user is translated through the stylus and mechanical linkage to a processor which communicates with the computer, thus allowing commands to be sent to the computer which track the three-dimensional motion of the user. Therefore, cursor control in three-dimensions on the two-dimensional computer screen is possible.

In one embodiment, the stylus is supportable on a fixed surface by a set of mechanical linkages which include individual components joined together by a sufficient number of joints to allow several degrees of freedom in the motion of the stylus. These mechanical linkages provide mechanical leverage, friction, counter-weighing, and/or spring resistance in order to reduce fatigue of the user and to provide support to enhance the stability and dexterity of user manipulation of the stylus.

An embodiment of the present invention includes computer software and hardware which will provide force feedback information from the computer to the stylus. The computer sends feedback signals to the mechanical linkage which has force generators for generating force in response to images depicted on the computer screen. Incoming commands from the host computer are monitored by the microprocessor and instruct the microprocessor to report forces felt by a joint or set forces on a joint of the mechanical linkage.

Another aspect of the present invention includes a remote control unit which is used in place of a command clicker on the stylus. For example, a foot pedal or hand-held unit for the user's opposite hand is included to provide command control to the computer. Accordingly, manual dexterity of stylus manipulation is not compromised.

DESCRIPTION OF THE DRAWINGS

FIG. 5 is a perspective representation of another embodiment of the present invention;

FIG. 6 is a perspective view of still another embodiment of the present invention;

FIG. 7 is a perspective representation of another embodiment;

DESCRIPTION OF PREFERRED EMBODIMENTS

Figure 1:
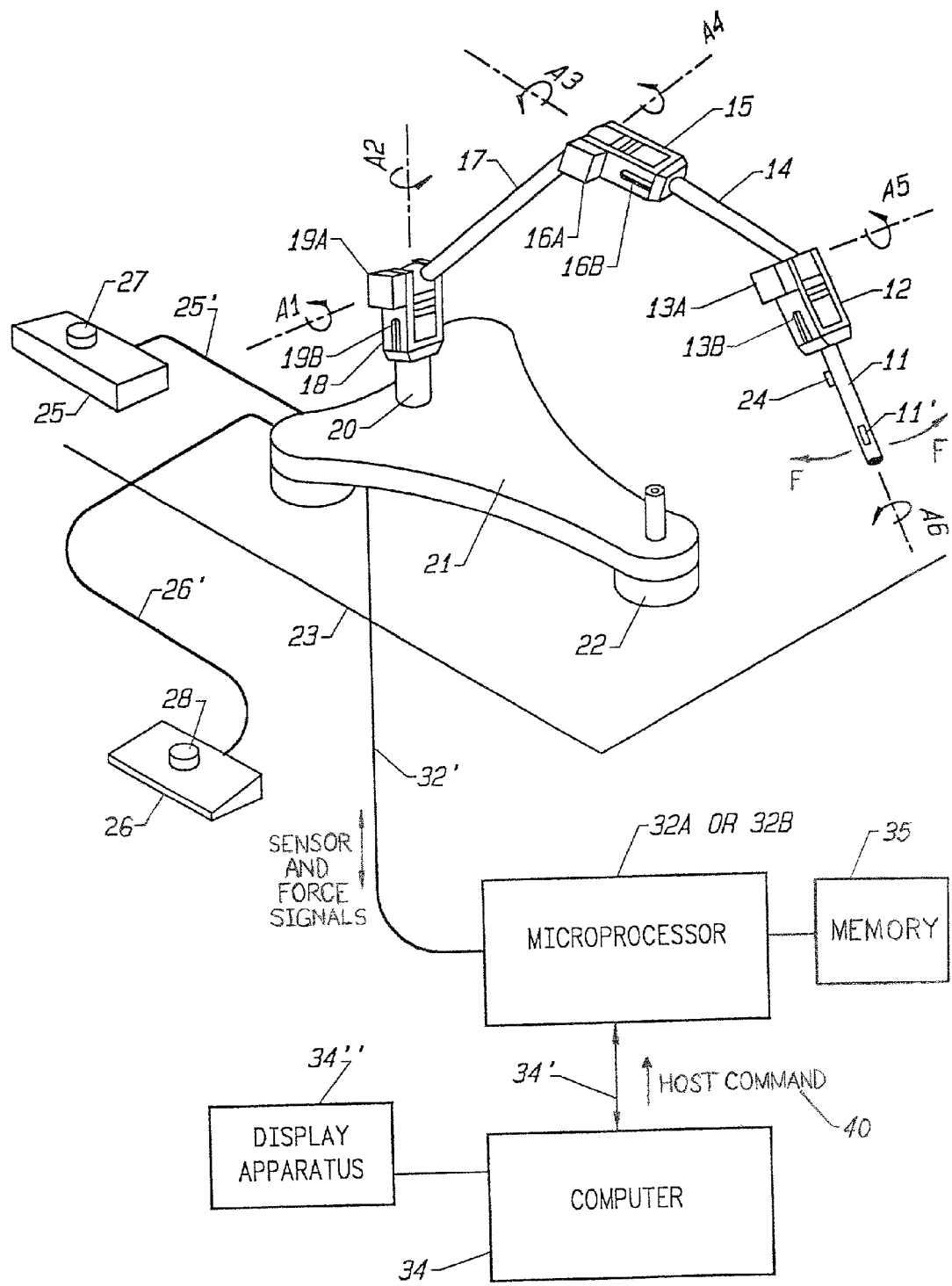
FIG. 1 is a perspective view of an embodiment of the present invention.

Referring to FIG. 1, a stylus 11 is shown attached to a support apparatus which is, in turn, supported on a fixed surface. By electrical and electronic configurations described below, the stylus 11 is adapted to provide data from which a computer or other computing means such as a microprocessor can ascertain the position and orientation of the stylus as it moves in three-dimensional space. This information is then translated to an image on a computer display apparatus. The stylus 11 may be used, for example, by an operator to change the position of a cursor on a computer controlled display screen by changing the position and/or orientation of the stylus, the computer being programmed to change the position of the cursor in proportion to the change in position and/or orientation of the stylus. In other words, the stylus 11 is moved through space by the user to designate to the computer how or where to move the cursor on a computer display apparatus.

Also contemplated in the present invention is computer software and hardware which will provide feedback information from the computer to the stylus and cause forces on the stylus. This implementation is described in greater detail subsequently.

The stylus 11 is a pen-like stick which can be manipulated between the fingers, allowing for much better control and fine dexterity as compared to full hand grips or palm-supported styluses used by some prior art inventions. While the stylus 11 is described in terms of manual manipulation, other stylus configurations are envisioned by the present invention. In particular, this invention includes manipulation by those unable to manually manipulate a pen. A stylus of the present invention, need not be linear, but may be curved or angled so that it may be held, for example, by the foot or the mouth of a person.

Because the stylus is supported by a support apparatus which is in turn supported by a fixed surface or other stabilizing configuration, the user can manipulate the stylus with a minimum of effort. Also, if the user chooses to discontinue using the stylus, it is capable of maintaining its position in space, unattended. While FIG. 1 shows that preferred embodiment of the present invention, FIGS. 5–8 show alternative embodiments, such which are also contemplated under the present invention. It is preferable that the stylus have enough degrees of freedom to enable it to move through the mechanical linkage to give the user the amount of flexibility needed to move the cursor as desired. In FIG. 1, six degrees of freedom are shown and are labeled as Axis A1, A2, A3, A4, A5, and A6. This, of course, provides maximum flexibility. Fewer degrees of freedom, such as a plurality of degrees of freedom, may also be sufficient depending on the application.

In one embodiment, the stylus is connected to rigid individual components which are joined together by joints. While not shown, other types of support apparatus' are included in the present invention. For example, other configurations include a semi-flexible rod or any other moveable while supportive configuration which can support the stylus in the manner described herein.

In FIG. 1, a mechanical linkage pursuant to the present invention is depicted. The stylus 11 is coupled to supportable mechanical linkages via joint 12 which, in the shown embodiment, houses sensors 13A and 13B. Linkage 14, connected, via joint 15 having position sensors 16A and 16B, to linkage 17. Joint 18 in turn connects linkage 17 with the vertical base protrusion 20 which emanates from the base 21. The sensors are used to produce a stylus locative signal which is responsive to and corresponds with the position of the stylus at any point in time during its normal operation. The stylus locative signal is used to provide information for use by a computer display apparatus of a computer. The term "joint" as used herein is intended to mean the connection mechanism between individual linkage components. In fact, two separate moveable members can be joined; such together forming a joint.

The base 21, if necessarily, can be immobilized by securing it onto the fixed surface 23 by way of bolt, screw or other attachment mechanism 22. Moreover, the present invention implements mechanical leverage and rubbing friction (not shown) between the supportable mechanical linkages 14 and 17 and the joints 12, 15 and 18 in order to provide resistance and support so as to allow better dexterity than can be achieved with free-floating stylus trackers. This support and leverage aids in reducing the fatigue associated with manipulating the free-floating stylus 11.

As mentioned above, attached to each joint 12, 15 and 18 are sensors 13A, 13B, 16A, 16B, 19A, and 19B, respectively. These sensors sense the angle differential before and after motion of the two segments connected by that joint. The sensors can be, for example, optical incremental encoders, optical absolute encoders and potentiometers. Because the three-dimensional position and/or orientation tracking is achieved mechanically, this preferred embodiment avoids problems that magnetic and ultrasonic sensors, such as those shown in the prior art, encounter with metal and shadowing. However, as shown in FIG. 1, if desired, sensing means can be used to track the position and/or orientation of the stylus by mounting a single or several orientation sensors in the stylus 11 itself, such referred to as a stylus mounted sensor 11'. An ultrasound, magnetic, optical or position and orientation sensor can be used as the stylus mounted sensor 11'.

FIG. 1 also shows a clicker button 24 on stylus 11. The button is connected to a switch which when in the on state, sends a signal to the computer giving it a command. In order to provide for accuracy when sending commands, this invention also includes a remote clicker unit. Therefore, since the clicking motion occurs at a distant location from the cursor control, there is little or no opportunity to accidently move the cursor while making a command. FIG. 1 shows two configurations for implementing this aspect of the present invention. The first is identified as an alternate hand-clicker 25, the second as foot pedal 26.

Digital buttons 27 and 28 which are connected to switches (not shown) on the remote attached peripherals such as a hand-held clicker unit 25 or a foot pedal 26, respectively, can generate additional digital input such transmitted through lines 25' and 26' respectively. Either of the shown ancillary remote command units, such including the hand unit 25 and the foot pedal 26 configurations, are favorable methods of inputting digital commands by command hardware or software (not shown) because pressing the button 27 or 28 does not compromise a user's ability to hold the stylus steady whereas pressing any button 24 on the stylus does compromise stylus stability.

Figure 2A:
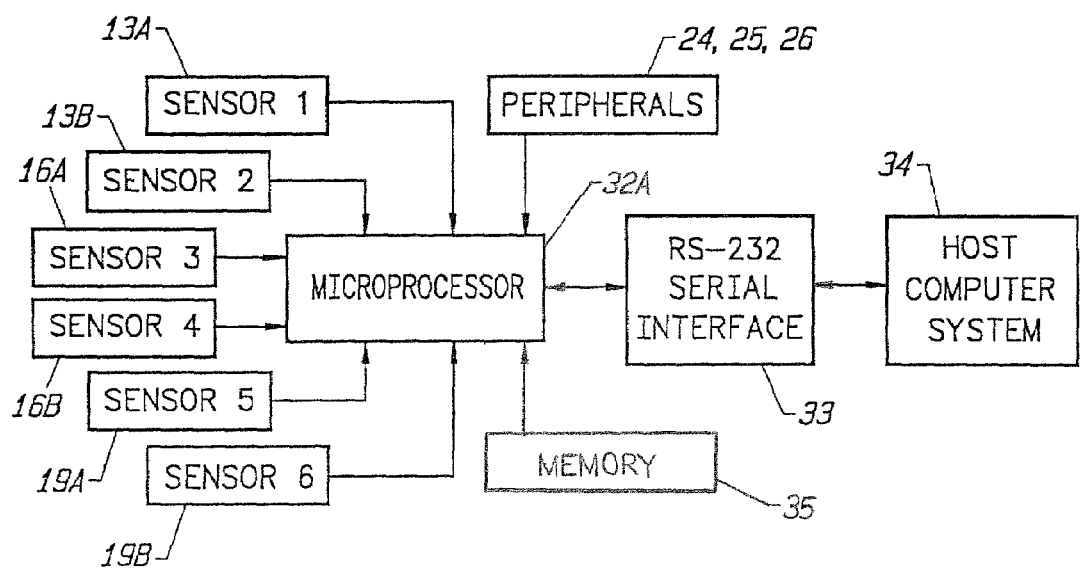
FIGS. 2A and 2B are block diagrams over-viewing two different electronic hardware configurations of the present invention.
Figure 2B:
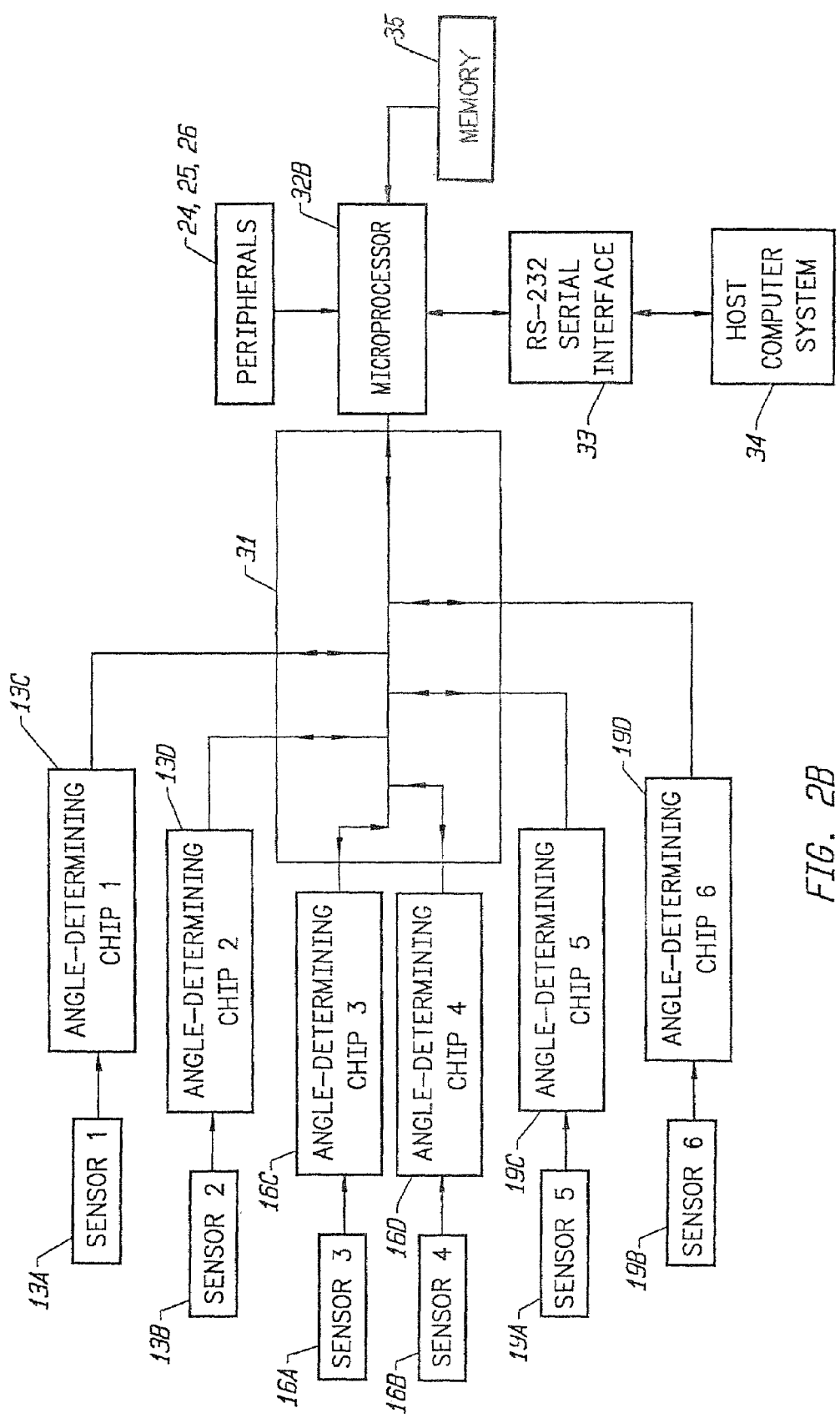

Referring to FIG. 2A, the sensors 13A, 13B, 16A, 16B, 19A and 19B, along with any peripherals 24, 25 or 26, can send their digital signals directly to a versatile floating-point processor or microprocessor 32A which is controlled by software stored in a digital ROM (Read-Only Memory) 35 via transmission line 32' or another form of transmission, i.e., radio signals. As shown in FIG. 2B, an alternative embodiment can be used to lessen the demands on the floating-point processor or microprocessor 32B. The digital inputs of the sensors 13A, 13B, 16A, 16B, 19A and 19B can be sent indirectly to the floating-point processor or microprocessor 32B by way of dedicated chips 13C, 13D, 16C, 16D, 19C and 19D, which pre-process the angle sensors' signals before sending them via bus 31 to the floating-point processor or microprocessor 32B which would combine these signals with those from the peripherals 24, 25 or 26. An 8-bit data bus plus chip-enable lines allow any of the angle determining chips to communicate with the microprocessor. Moreover, reporting the status of peripherals 24, 25 or 26 includes reading the appropriate digital switch and placing its status in the output sequence array. Some examples of specific electronic hardware usable for sensor pre-processing include quadrature counters, which are common dedicated chips that continually read the output of an optical incremental encoder and determine an angle from it, Gray decoders, filters, and ROM look-up tables.

The single-chip configuration of FIG. 2A is most applicable where the angle sensors 13A, 13B, 16A, 16B, 19A and 19B are absolute sensors, which have output signals directly indicating the angles without any further processing, thereby requiring less computation for the microprocessor 32A and thus little if any pre-processing. The multi-chip configuration of FIG. 2B is most applicable if the sensors 13A, 13B, 16A, 16B, 19A and 19B are relative sensors, which indicate only the change in an angle and which require further processing for complete determination of the angle.

In either configuration, if the microprocessor 32A or 32B is fast enough, it will compute stylus 11 position and/or orientation (or motion, if desired) on board the embodiment and send this final data through any standard communications interface such as an RS-232 serial interface 33 on to the host computer system 34 and to computer display apparatus 34'' through transmission line 34' or another form of transmission. If the microprocessor 32A or 32B is not fast enough, then the angles will be sent to the host computer 34 which will perform these calculations on its own.

In addition to the single-chip and multi-chip configurations, a variation may consist of a single microprocessor which reads the peripherals, obtains the angles, possibly computes coordinates and orientation of the stylus 11, and supervises communication with the host computer 34. Another variation may consist of dedicated sub-circuits and specialized or off-the-shelf chips which reads the peripherals, monitors the angle sensors 13A, 13B, 16A, 16B, 19A and 19B, determine the joint angles, and handle communications with the host computer 34, all without software or a microprocessor 32A or 32B.

Software is only included in the two microprocessor-based configurations shown in FIGS. 2A and 2B. The more dedicated hardware a given configuration includes, the less software it requires. The software consists of a main loop (FIG. 3) and an output interrupt (FIGS. 4A and 4B).

Figure 3:
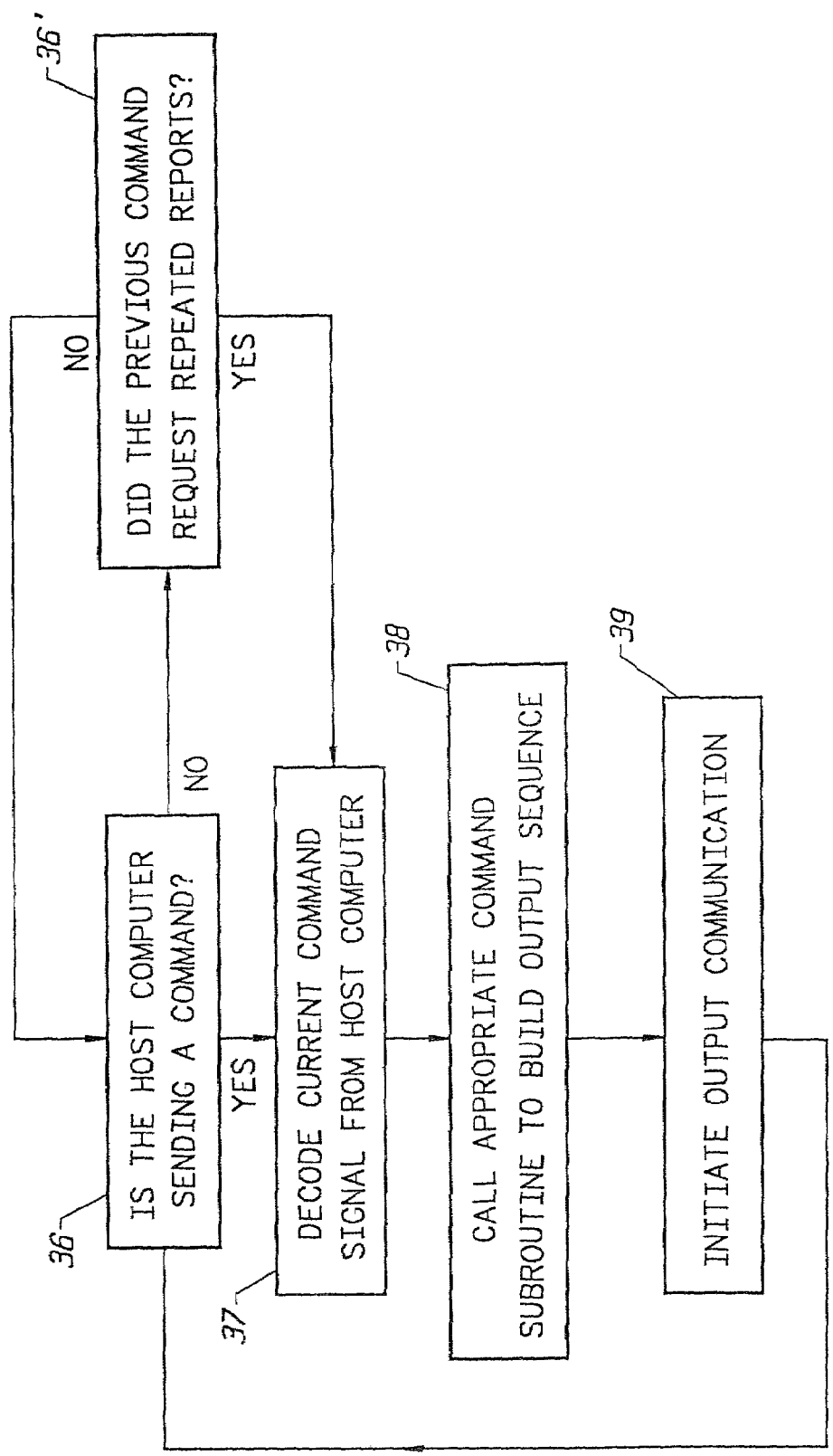
FIG. 3 is a flow chart describing the main software loop for two different electronic hardware configurations shown in FIG. 2.

Referring to FIG. 3, the main command loop responds to the host computer 34 and runs repeatedly in an endless cycle. With each cycle, incoming commands from the host computer are monitored 36 and decoded 37, and the corresponding command subroutines for reporting angles, thus stylus position and/or orientation (see FIGS. 4A and 4B), are then executed 38. Two possible subroutines are shown in FIGS. 4A (single-chip method) and 4B (multi-chip method). When a subroutine terminates, the main command loop resumes 39. Available command will include but are not limited to: reporting the value of any single angle, reporting the angles of all six angles at one time, reporting the values of all six angles repeatedly until a command is given to cease aforementioned repeated reporting, reporting the status of peripheral buttons, and setting communications parameters. If the angle sensors require preprocessing, these commands will also include resetting the angle value of any single angle or otherwise modifying preprocessing parameters in other applicable ways. Resetting pre-processed angle values or preprocessing parameters does not require output data from the device. The microprocessor 32A or 32B simply sends appropriate control signals to the preprocessing hardware 13C, 13D, 16C, 16D, 19C, and 19D. If the microprocessor or floating-point processor is fast enough to computer stylus coordinates and orientation, these commands will also include reporting the stylus coordinates once, reporting the stylus coordinates repeatedly until a command is given to cease, ceasing aforementioned repeated reporting, reporting the stylus coordinates and orientation once, reporting the stylus coordinates and orientation repeatedly until a command is given to cease, ceasing aforementioned repeated reporting. If force reflection is supported, these commands will also include reporting the forces felt by any single joint, setting the resistance of any single joint, and locking or unlocking a joint.

Figure 4B:
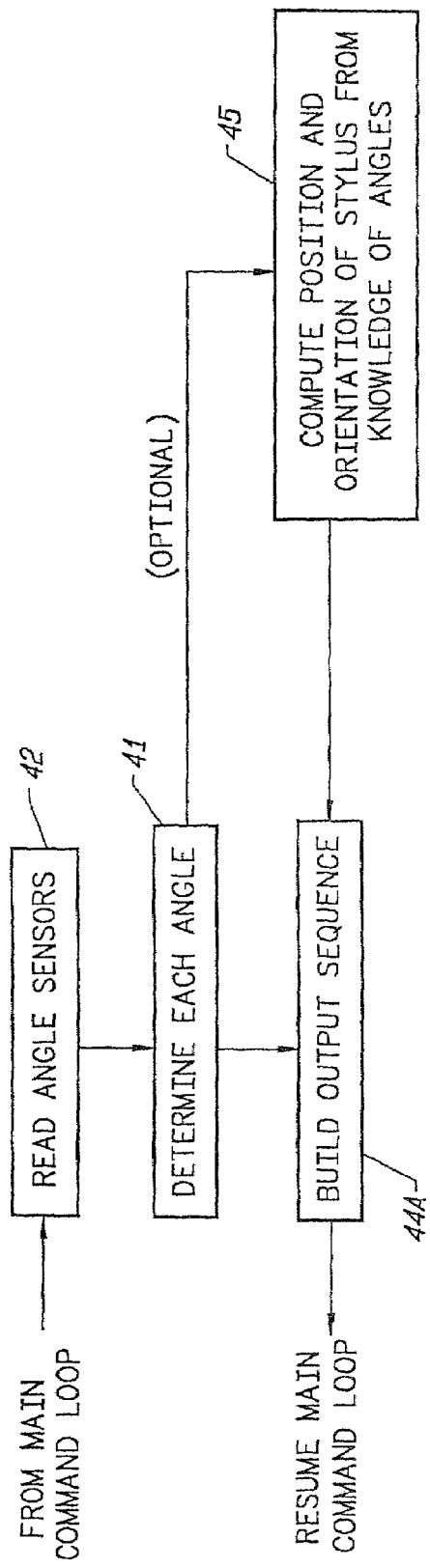
FIGS. 4A and 4B are flow charts describing two different interrupt service routines for serial output to host computer.
Figure 4A:
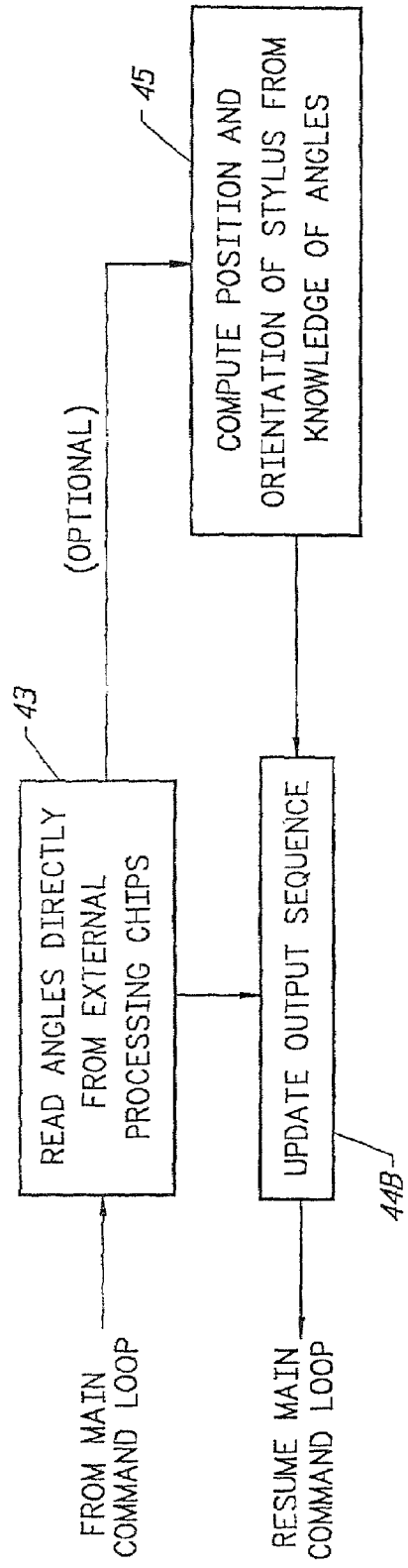

Any report by the subroutines of FIGS. 4A and 4B of a single angle value requires determining 41 the given joint angle. For the single-chip configuration shown in FIG. 2A, this subroutine directly reads the appropriate angle sensor 42 from among sensors 13A, 13B, 16A, 16B, 19A, and 19B. For the multi-chip configuration shown in FIG. 2B, this subroutine reads the outputs 43 of pre-processing hardware 13C, 13D, 16C, 16D, 19C, and 19D which have already determined the joint angles from the outputs of the sensors 13A, 13B, 16A, 16B, 19A, and 19B. Any report of multiple angles is accomplished by repeatedly executing the subroutine for reporting a single angle. The subroutine is executed once per angle, and the values of all angles are then included in the output sequence array. If the optional parts of the subroutines 45 are included, then these subroutines become the coordinate reporting subroutines. Many other command subroutines exist and are simpler yet in their high-level structure.

After determining the given joint angle, the microprocessor 32A or 32B creates an output sequence 44A or 44B by assembling an array in a designated area of processor memory 35 which will be output by the microprocessor's communications system at a given regular communications rate. The sequence will contain enough information for the host computer 34 to deduce which command is being responded to, as well as the actual angle value that was requested. Returning to FIG. 3, a query 36 in the main command loop asks whether the previous command requested repeated reports. If so, the main command loop is initiated accordingly. The communications output process (not shown) may be as simple as storing the output data in a designated output buffer, or it may involve a standard set of communications interrupts that are an additional part of the software. Setting communications parameters does not require output data from the device. The microprocessor 32A or 32B simply resets some of its own internal registers or sends control signals to its communications sub-unit.

To report the stylus' 11 coordinates, three of the five or six angle values are pre-read and knowledge of link lengths and device kinematics are incorporated to compute stylus 11 coordinates. These coordinates are then assembled in the output sequence array.

To report the stylus' 11 orientation, at least five angle values are read and knowledge of link lengths and device kinematics are incorporated to computer stylus 11 orientation. The orientation consists of three angles (not necessarily identical to any joint angles) which are included in the output sequence array.

Forces felt by a joint, setting a joint's resistance, and locking or unlocking a joint are accomplished by using interaction of the microprocessor 32A or 32B with forced-reflecting hardware. Reporting forces felt by a joint uses a force sensor mounted on the joint and then places the resulting value in the output sequence array. To set a joint's resistance and lock or unlock a joint, control signals are used to control force-reflection hardware, and do not require any output data of the device.

Also contemplated in the present invention is computer software and hardware which will provide feedback information from the computer to the stylus, such as host commands 40 (shown FIG. 1). This type of implementation is known in robotics and thus is easily incorporated into a system including the present invention. When a surface is generated on the computer screen, the computer will send feedback signals to the mechanical linkage which has force generators indentified by numerals 13A, 13B, 16A, 16B, 19A, and 19B (which also indentifies the sensors, see above) for generating force F (see FIG.1) in response to the cursor position on the surface depicted on the computer screen. Force is applied for example, by added tension in the joints which is in proportion to the force being applied by the user and in conjunction with the image on the screen.

Figure 8:
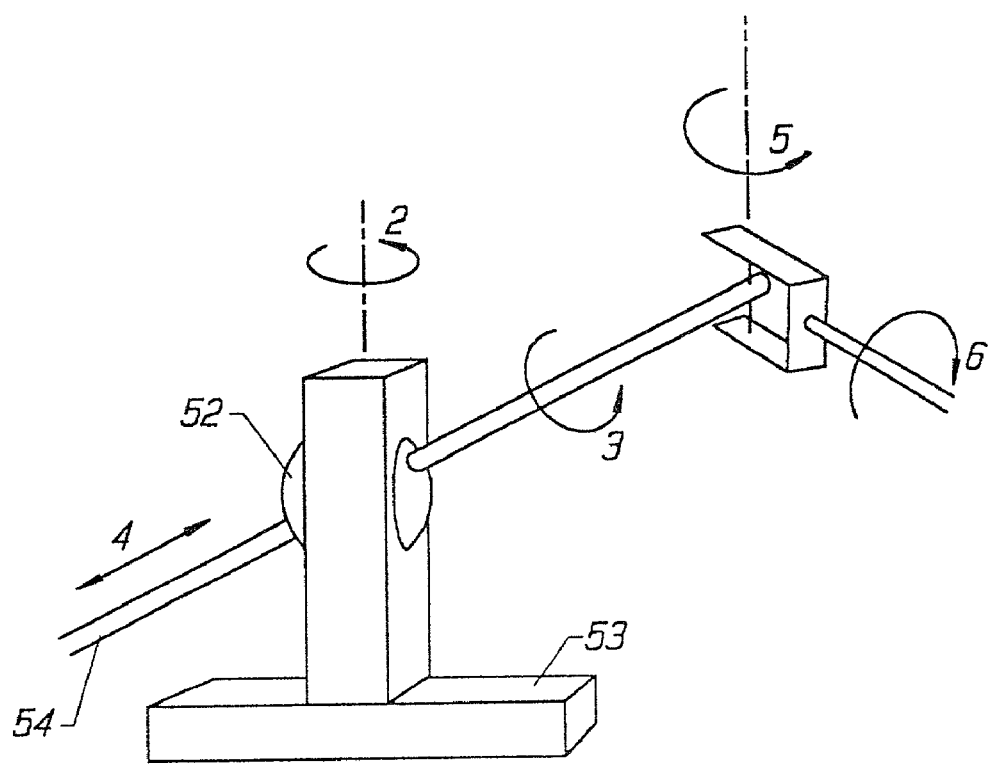
FIG. 8 is a perspective view of another embodiment.

The various configurations of the mechanical linkages shown in FIG. 5, FIG. 6, FIG. 7 and FIG. 8 which have different numbers of individual components and joints than shown in FIG. 1 are illustrative of the numerous possible configurations which can provide varying degrees of freedom inherent in the present invention. Referring to FIG. 5, FIG. 6 and FIG. 8, note that a rounded object such as a ball can act as a joint having motion in three degrees of freedom. In conjunction with other mechanical linkages and attachments, this permits sufficient degrees of freedom for the purposes of the present invention. In each figure, the orientation of the degrees of freedom of each joint is depicted by curved lines, numbered consecutively.

Briefly, FIG. 5 shows an embodiment having 6 rotary joints including a rounded joint 46 at the base such that three degrees of motion are available at that joint. FIG. 6 shows an embodiment having 5 rotary joints and one linear joint, including a three-dimensionally rotatable rounded joint 47 at the base through which one mechanical linkage can slide linearly and where the base is attached to a fixed surface 48 such that the surface does not prohibitively impede the movement of the device. FIG. 7 shows an embodiment having 3 rotary joints and 3 linear joints, where the basal connection can slide about the base in a two-dimensional plane in the cross configuration 49 on base 51. FIG. 8 shows an embodiment having 5 rotary joints and 3 linear joints, including three-dimensionally rotatable rounded joint 52 at a perpendicular projection from the base 53 through which one mechanical linkage 54 can slide linearly through the joint 52.

Figure 9:
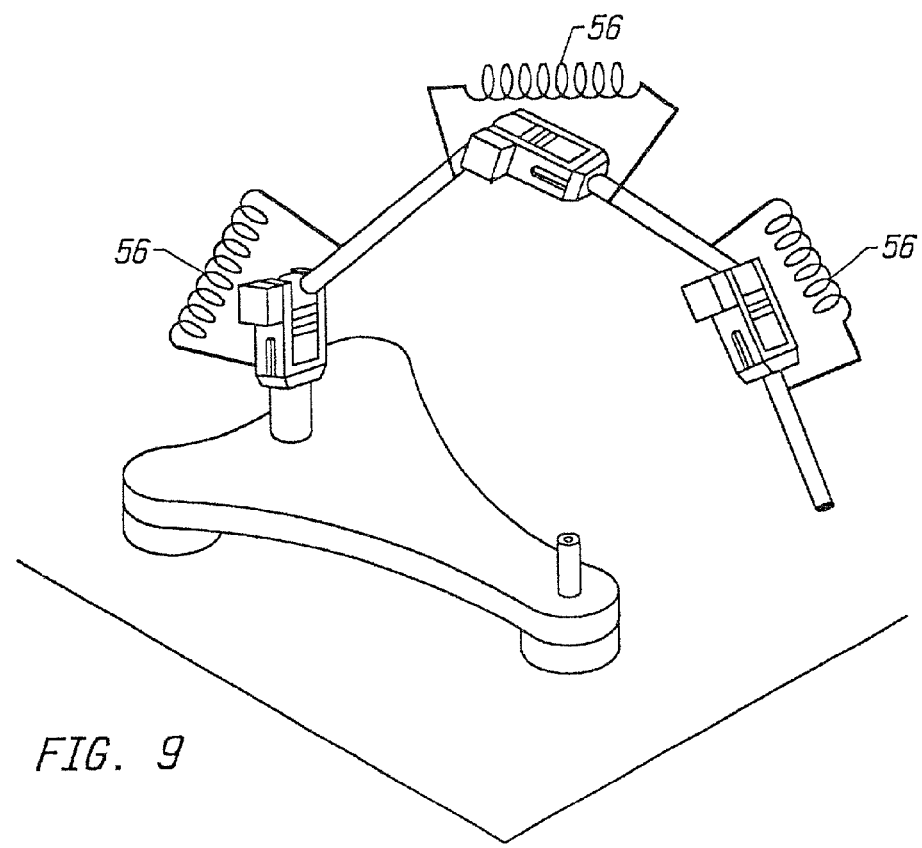
FIG. 9 shows an embodiment of the resistance mechanism of the present invention.
Figure 10:
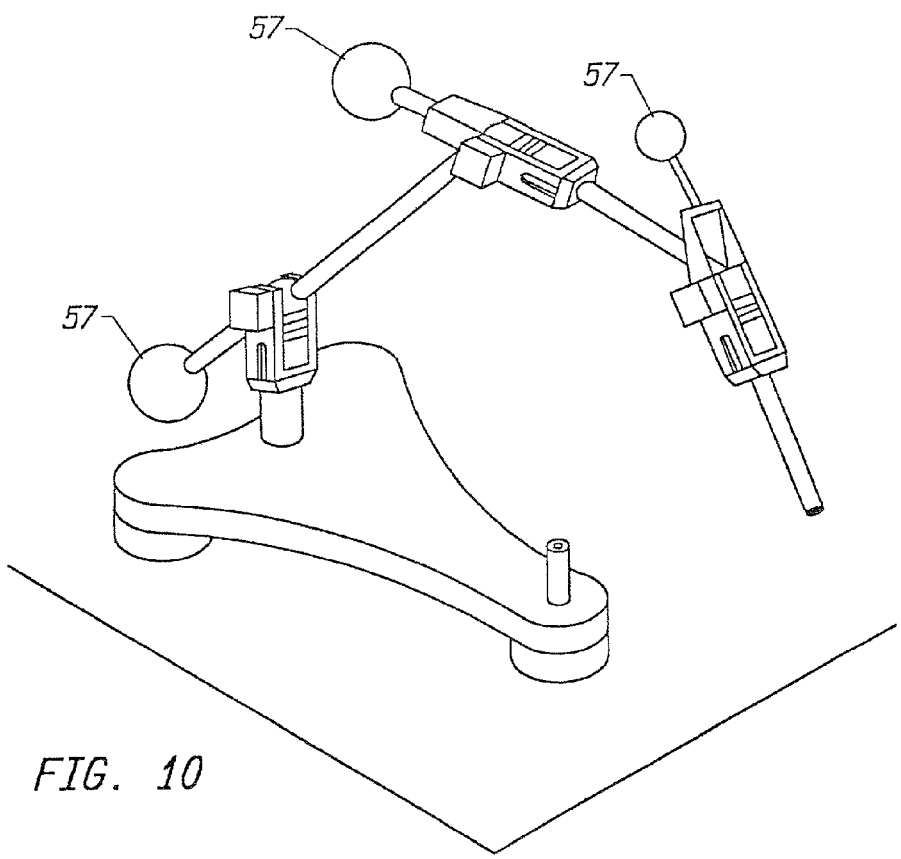
FIG. 10 shows another embodiment of the resistance mechanism.
Figure 11:
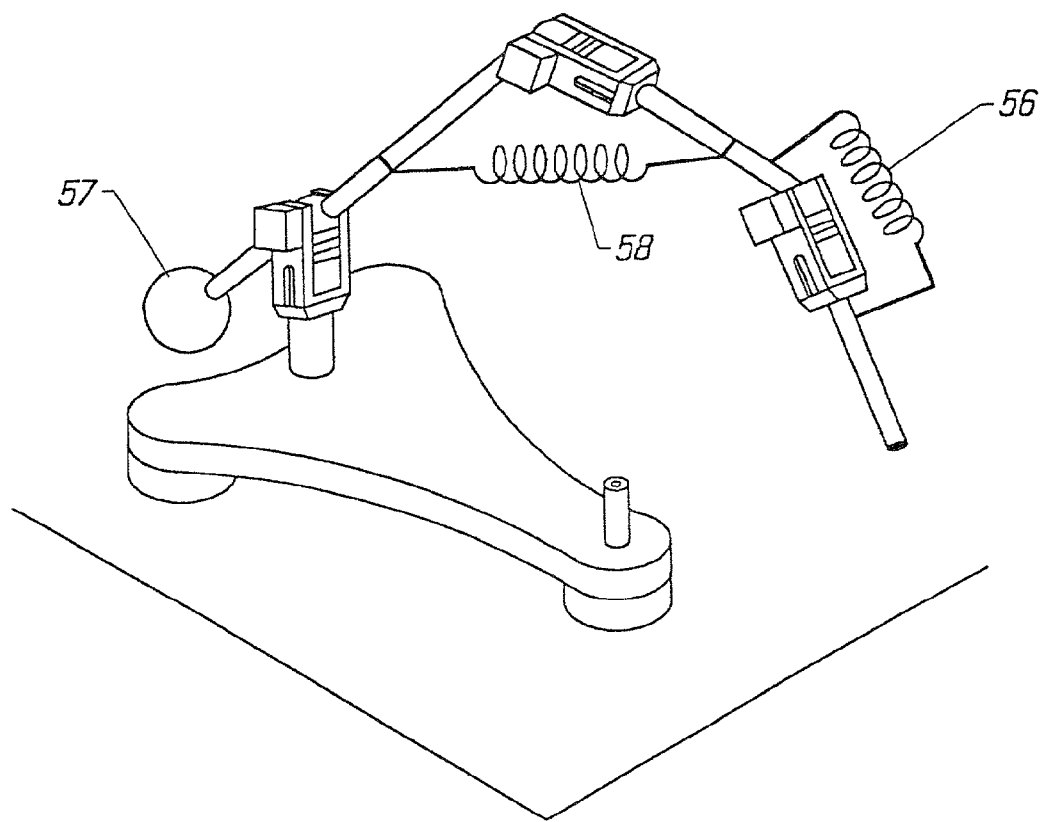
FIG. 11 shows yet another embodiment of the resistance mechanism.

While any of the above discussed configurations or others can be used in accordance with the present invention, FIGS. 9–11 show different mechanisms for providing resistance to the manual manipulation of the stylus by the user. FIG. 9, for example, shows return or tension springs 56 on each joint of the embodiment shown in FIG. 1. In an alternative embodiment, FIG. 10, shows counter-weights 57 on each joint. Moreover, FIG. 11, shows a combination of a return or tension spring 56, a counter-weight 57 and a compression spring 58. The arrangement of the resistance mechanism used should depend upon the configuration stylus mechanical linkage combination, such arrangement preferably chosen to maximize the ease with which the user can manipulate the stylus 11 in free space in accordance with the present invention.

What is claimed:

1. A method, comprising:
   receiving a locative signal associated with a position and an orientation of a user-manipulable object in a plurality of degrees of freedom;
   displaying an image in a graphical environment, the image correlated with the position and the orientation of the user-manipulable object; and
   outputting a feedback force signal corresponding to at least one of the plurality of degrees of freedom of the user-manipulable object, the feedback force responsive to the locative signal,
   wherein the user-manipulable object includes a stylus coupled to a mechanical linkage, the mechanical linkage configured to enable the user-manipulable object to be movable in the plurality of degrees of freedom.

2. The method of claim 1, wherein the stylus is adapted for at least one of hand use, foot use, and mouse use.

3. The method of claim 1, wherein the image displayed in the graphical environment includes a cursor, a motion of the cursor being correlated with the position and the orientation of the user-manipulable object.

4. The method of claim 1, further comprising using the feedback force to effect a motion of the user-manipulable object in the at least one of the plurality of degree of freedom.

5. An apparatus, comprising:
   a user-manipulable object moveable in a plurality of degrees of freedom;
   at least one sensor coupled to the user-manipulable object, the at least one sensor being operative to provide a locative signal associated with a position and an orientation of the user-manipulable object in the plurality of degrees of freedom; and
   a force generator coupled to the user-manipulable object and configured to output a feedback force in at least one of the plurality of degrees of freedom of the user-manipulable object, the feedback force correlated with the locative signal,
   wherein the user-manipulable object includes a stylus coupled to a mechanical linkage, the mechanical linkage configured to enable the user-manipulable object to be movable in the plurality of degrees of freedom.

6. The apparatus of claim 5, wherein the locative signal is configured to enable a display an image in a graphical environment, the image is correlated with the position and the orientation of the user-manipulable object.

7. The apparatus of claim 5, wherein the stylus is adapted for at least one of hand use, foot use, and mouse use.

8. The apparatus of claim 5, wherein the mechanical linkage includes a plurality of joints, at least one joint from the plurality of joints is coupled to a support base.

9. The apparatus of claim 8, wherein the plurality of the joints include at least one rotary joint.

10. The apparatus of claim 9, wherein the plurality of the joints include at least one linear joint.

11. The apparatus of claim 8, wherein the feedback force operates to effect a motion of the user-manipulable object associated with at least one joint from the plurality of the joints.

12. The apparatus of claim 11, wherein the feedback force includes at least one of a resistive force and an elastic force.

13. The apparatus of claim 5, further comprising a processor in communication with the at least one sensor and the force generator, the processor operable to receive the locative signal from the at least one sensor and output a control signal to the force generator, the control signal causing the force generator to output the feedback force.

14. An apparatus, comprising:
a mechanical linkage having a first end and a second end, the first end of the mechanical linkage being coupled to a stylus, the second end of the mechanical linkage being coupled to a support base, the mechanical linkage including a plurality of joints configured to allow the stylus to be manipulable in a plurality of degrees of freedom;
a plurality of sensors coupled to the plurality of joints of the mechanical linkage, the plurality of sensors operative to provide a locative signal associated with a position and an orientation of the stylus; and
a force generator coupled to the mechanical linkage, the force generator configured to output a feedback force responsive to the position and the orientation of the stylus.

15. The apparatus of claim 14, further comprising a processor in communication with the sensors and the force generator, the processor operable to receive the locative signal from the plurality of sensors and output a control signal to the force generator, the force generator configured to output the feedback force in response to the control signal.

16. The apparatus of claim 14, wherein the processor is operable to send an image signal configured to enable an image being displayed in a graphical environment, the image correlated with the position and orientation of the stylus.

17. The apparatus of claim 14, further comprising an auxiliary sensor coupled to the stylus.

18. The apparatus of claim 17, wherein the auxiliary sensor includes at least one of an ultrasonic sensor, an optical sensor, and a magnetic sensor.

19. The apparatus of claim 14, wherein the plurality of degrees of freedom include at least five degrees of freedom.

20. The apparatus of claim 14, wherein the stylus is adapted for at least one of hand use, foot use, and mouse use.

21. The apparatus of claim 14, further comprising a resistance mechanism coupled to the mechanical linkage.

22. The apparatus of claim 21, wherein the resistance mechanism includes at least one of counter weights and springs.

23. A processor-executable program, stored on a computer-readable medium, comprising:
code to receive a locative signal associated with a position and an orientation of a user-manipulable object in a plurality of degrees of freedom;
code to display an image in a graphical environment, the image correlated with the position and the orientation of the user-manipulable object; and
code to output a feedback force signal corresponding to at least one of the plurality of degrees of freedom of the user-manipulable object, the feedback force responsive to the locative signal,
wherein the user-manipulable object includes a stylus coupled to a mechanical linkage, the mechanical linkage configured to enable the user-manipulable object to be movable in the plurality of degrees of freedom.

24. The processor-executable program of claim 23, the image including a cursor displayed in the graphical environment, the processor-executable program further comprising: code to correlate a motion of the cursor with the position and the orientation of the user-manipulable object.

25. The processor-executable program of claim 23, wherein the feedback force is associated with the at least one of the plurality of degrees of freedom of the user-manipulable object.

* * * * *